United States Patent [19]
Okuno et al.

[11] Patent Number: 5,987,143
[45] Date of Patent: Nov. 16, 1999

[54] METHOD AND APPARATUS FOR ERASING ACOUSTIC ECHO

[75] Inventors: Takatoshi Okuno; Mikio Tohyama, both of Hachioji; Hirofumi Yanagawa, Tsurugashima, all of Japan

[73] Assignee: Pioneer Electronic Corporation, Japan

[21] Appl. No.: 08/823,367

[22] Filed: Mar. 24, 1997

[30] Foreign Application Priority Data

Mar. 25, 1996 [JP] Japan ................................ 8-068610

[51] Int. Cl.$^6$ .................................................. H04B 3/20
[52] U.S. Cl. ............................ 381/66; 379/406; 379/410
[58] Field of Search ............................. 381/66; 379/406, 379/410, 411; 364/724.19

[56] References Cited

U.S. PATENT DOCUMENTS 5,553,014   9/1996   De Leon ............................ 364/724.19

OTHER PUBLICATIONS

Hada et al. "Studies on Echo Canceller Having Duo–Filter Using ES Projection Algorithm", Transactions of Conference held by Institute of Acoustic Engineers of Japan, Mar. 1995, pp. 595–596.

*Primary Examiner*—Minsun Oh Harvey
*Attorney, Agent, or Firm*—Evenson, McKeown, Edwards & Lenhan, P.L.L.C.

[57] ABSTRACT

An acoustic echo erasing apparatus which generates a pseudo-echo component from an audio reception signal (a vector $x_1$) using an adaptive filter, and removes the pseudo-echo component from an audio transmission signal (a vector y). The apparatus extracts a feedback component depending only on the audio reception signal from the audio transmission signal, and passes the audio reception signal through the adaptive filter to generate the pseudo-echo component while setting a transfer characteristic of the adaptive filter in accordance with the feedback component.

7 Claims, 4 Drawing Sheets

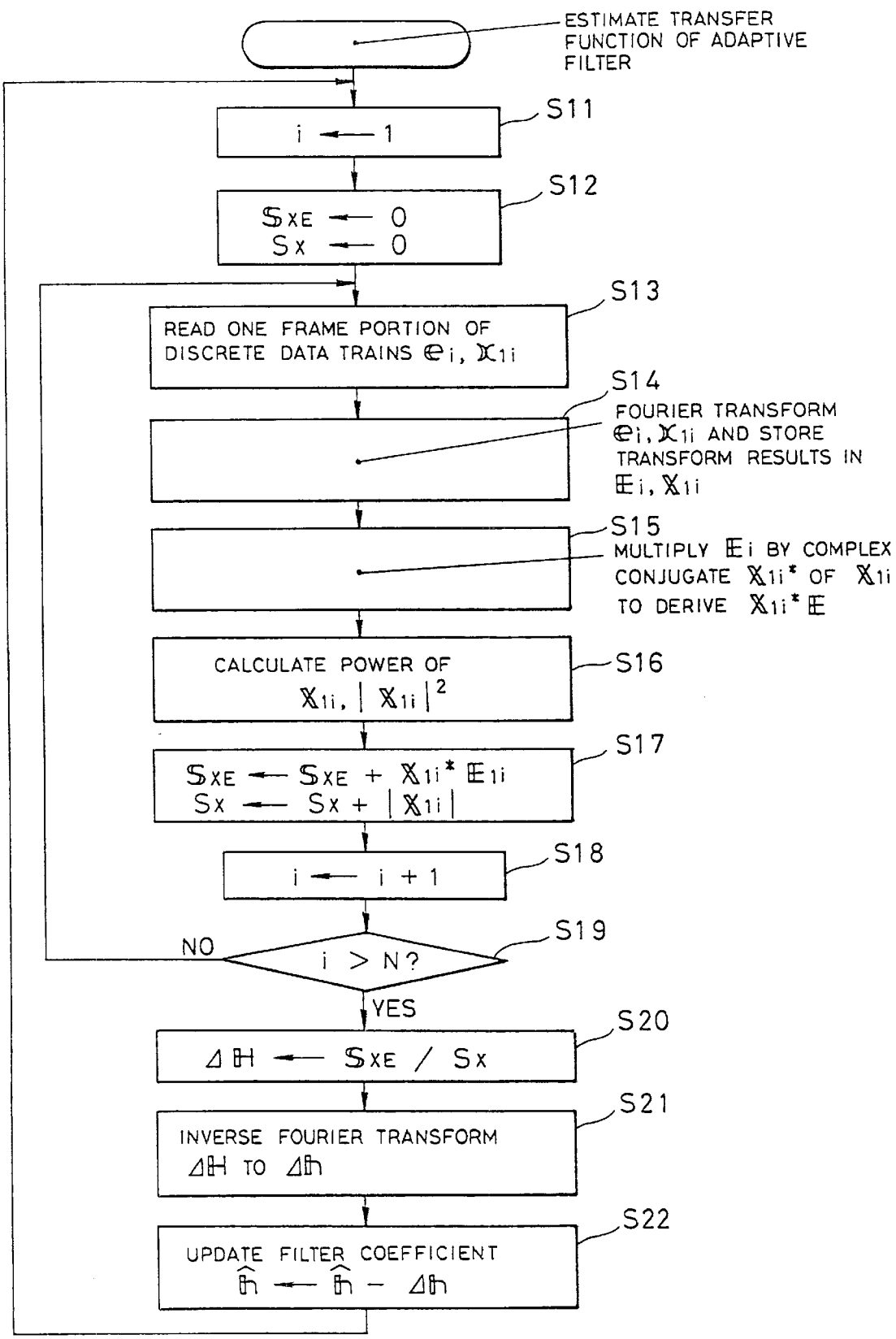

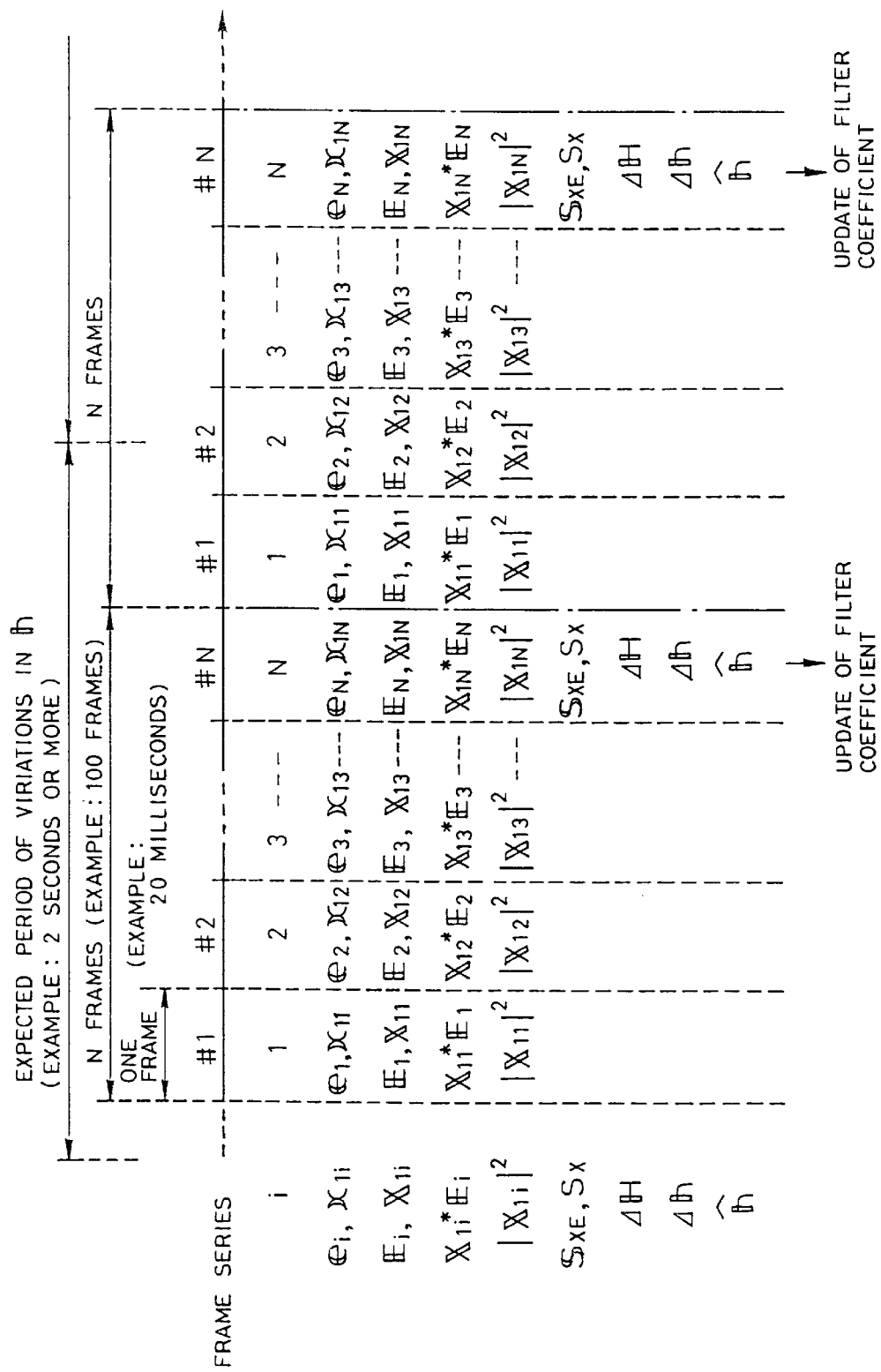

METHOD AND APPARATUS FOR ERASING ACOUSTIC ECHO

BACKGROUND OF THE INVENTION

1. Field of the Invention

The present invention relates to a method and apparatus for erasing acoustic echo.

2. Description of the Related Art

In communications apparatuses having a speech amplifying function for use in hands-free telephones, TV conference communications apparatuses and so on, an acoustic echo canceler is well known for canceling acoustic echo possibly generated on the basis of sound radiated from a speaker forming part of a receiver. Specifically, in communications between two speaker sides, sound radiated on one speaker side travels as an input signal to a microphone forming part of a transmitter of the one speaker side and then is included as acoustic echo into sound received by the other speaker side.

The conventional acoustic echo canceler, however, is not capable of appropriately canceling acoustic echo if so-called double talk occurs, where a feedback signal generated by sound radiated from a speaker of one speaker side and a voice transmission signal (also including surrounding sound) of the one speaker side are mixedly input into a microphone of the one speaker side. More specifically, the conventional echo canceler basically generates pseudo-echo for performing waveform processing on an input voice signal to remove echo included therein, and adds the pseudo-echo to an echo return path in opposite phase to erase the echo. Thus, when double talk occurs, the conventional acoustic echo canceler also recognizes a voice transmission signal of the one speaker side as an echo component to generate erroneous pseudo-echo, thereby occasionally failing to stably cancel acoustic echo.

An article entitled "Studies on Echo Canceler Having Duo-filter Using ES Projection Algorithm" by Hada and other three, Transactions of Conference held by Institute of Acoustics Engineers of Japan, March 1995, pp. 595-596 discloses a method as countermeasures to the occurrence of double talk as mentioned above.

According to the article, the echo canceler comprises an adaptive filter for estimating a transfer characteristic of an acoustic echo path; a semifixed filter coupled to receive a filter coefficient generated by the adaptive filter to actually cancel echo; and a convergence state determination circuit for controlling to transfer the adaptive filter coefficient to the semifixed filter when an error of the adaptive filter coefficient is small and when a comparison between the error of the adaptive filter coefficient and a coefficient generated by the semifixed filter determines that the error of the adaptive filter coefficient is smaller. Since the convergent state determination circuit prohibits the transfer of the filter coefficient from the adaptive filter to the semifixed filter when it detects disturbance in the adaptive filter coefficient caused by the occurrence of double talk, the semifixed filter holds a filter coefficient estimated immediately before the double talk occurs. In this way, favorable echo erasure can be carried out event when double talk occurs. Stated another way, since a voice transmission signal during double talk is disturbance added to a transfer path from a loud speaker to a microphone and does not cause any change in the characteristic of the transfer path from the loud speaker to the microphone, a coefficient generated before the disturbance occurs is used to erase echo so that the disturbance, i.e., the voice transmission signal only can be separated.

However, the method disclosed in this article essentially requires the convergence state determination circuit for detecting a disturbed filter coefficient to take countermeasures to double talk and the semifixed filter for holding a filter coefficient in a steady state, an apparatus implementing the method becomes excessively complicated.

Generally, simplification is strongly required for acoustic echo cancelers for use in hands-free telephones and so on, so that further improvements are desired to such acoustic echo cancelers.

SUMMARY OF THE INVENTION

The present invention has been made in view of the problems mentioned above, and its object is to provide a method and an apparatus for erasing acoustic echo which are capable of attending to double talk in a simple configuration.

The present invention provides an acoustic echo erasing apparatus utilizing adaptive filter means to generate a pseudo-echo component from an audio reception signal for removing the pseudo-echo component from a voice transmission signal, which is characterized by comprising means for extracting a feedback component from the audio transmission signal, the feedback component depending only on the audio reception signal and means for passing the audio reception signal through the adaptive filter means to generate the pseudo-echo component while setting a transfer characteristic of the adaptive filter means in accordance with the feedback component.

The present invention also provides an acoustic echo erasing apparatus utilizing adaptive filter means to generate a pseudo-echo component from an audio reception signal and subtractor means to subtract the pseudo-echo component from an audio transmission signal to generate an error signal, which is characterized by comprising first means for establishing a cross-correlation function of the error signal and the audio reception signal, second means for detecting an energy level of the audio reception signal, third means for calculating the ratio of a time average of the value of the cross-correlation function to a time average of the value of the energy level, and fourth means for updating a transfer characteristic of the adaptive filter means based on the ratio, and passing the audio reception signal through the adaptive filter means to generate the pseudo-echo component.

The present invention further provides an acoustic echo erasing apparatus which generates a pseudo-echo component from an audio reception signal, and subtracts the pseudo-echo component from an audio transmission signal to generate an error signal, characterized by comprising signal processing means for executing a first step of establishing a cross-correlation function of the error signal and the audio reception signal, a second step of detecting an energy level of the audio reception signal, a third step of calculating the ratio of a time average of the value of the cross-correlation function to a time average of the value of the energy level, and a fourth step of updating a transfer characteristic of the adaptive filter means based on the ratio, and passing-the audio reception signal through the adaptive filter means to generate the pseudo-echo component.

BRIEF DESCRIPTION OF THE DRAWINGS

FIG. 3 is a flow chart representing a processing procedure executed by a digital signal processor (DSP) in the echo canceler of FIG. 1 for estimating a transfer characteristic of the adaptive filter; and FIG. 4 is a table representing the processing of FIG. 3 on time series axis.

DETAILED DESCRIPTION OF THE PREFERRED EMBODIMENTS

Embodiments of the present invention will hereinafter be described in detail with reference to the accompanying drawings.

Figure 1:
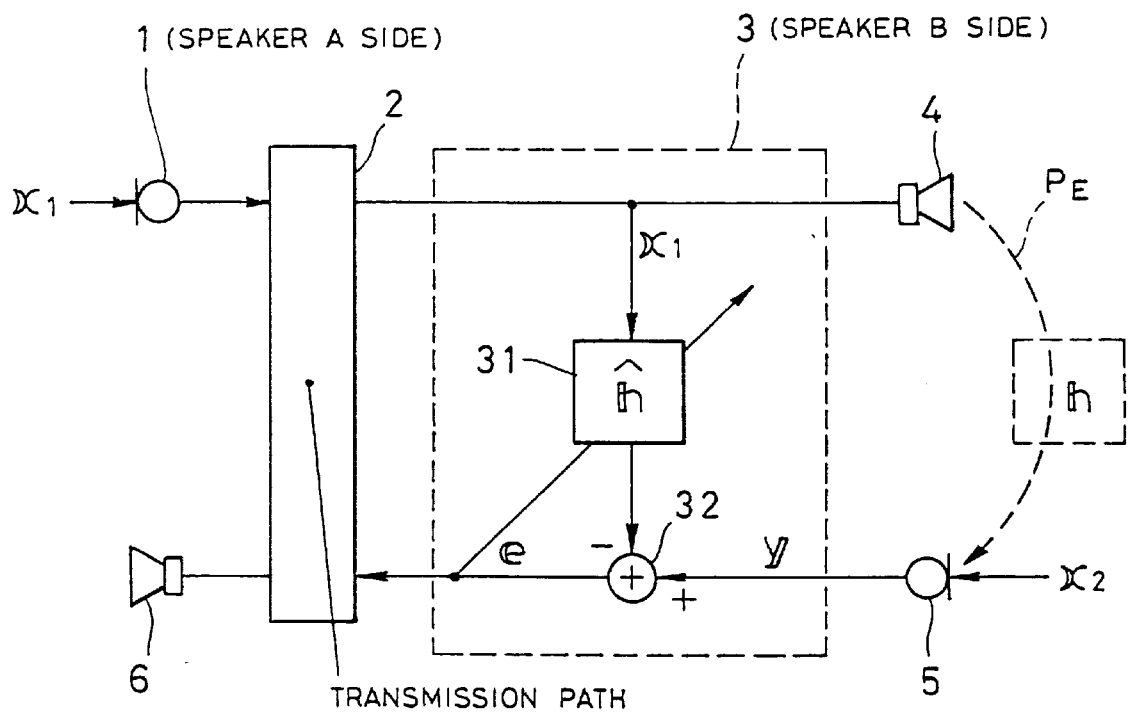
FIG. 1 is a conceptual block diagram illustrating a main configuration of a communications system of an embodiment to which an echo canceler according to the present invention is applied.

FIG. 1 is a conceptual block diagram illustrating a main configuration (hardware) of a communications system of an embodiment to which an echo canceler according to the present invention is applied.

Referring specifically to FIG. 1, a voice generated by a speaker A, which is represented by a vector $\mathfrak{X}_1$ (hereinafter the vector is denoted by $^v x_1$), is captured by a microphone 1 forming part of a transmitter on the speaker A side to be transduced from acoustic energy into electrical energy which is transmitted through a transmission path 2 to a speaker B as a voice (audio) signal $^v x_1$. On the speaker B side, the voice signal $^v x_1$ from the speaker A is supplied through a digital signal processor (DSP) 3 to a loud speaker 4 forming part of a receiver on the speaker B side. A transmitter of the speaker B is also provided with a microphone 5, such that a voice of the speaker B captured by the microphone 5, expressed by a vector $\mathfrak{Y}$ (hereinafter the vector is denoted by $^v y$ except for notations on the drawings), is supplied to the DSP 3. The B-side voice signal $^v y$ includes an acoustic radiation component from the speaker 4 captured by the microphone 5 and other audio components, and the latter is expressed by a vector $\mathfrak{X}_2$ (hereinafter the vector is denoted by $^v x_2$ except for notations on the drawings).

The DSP 3 comprises an adaptive filter 31, a differential circuit (or a subtractor) 32, a controller, not shown, and so on. The adaptive filter 31 receives, as an input, a voice signal from the speaker A side, i.e., the voice signal $^v x_1$ received at the speaker B side and supplies a filter output signal to the differential circuit 32. The differential circuit 32 receives the signal from the adaptive filter 31 after being inverted and the voice signal $^v y$ from the microphone, not inverted, and sends the sum of both signals, i.e., an output of the differential circuit 32 generated by subtracting the filter output signal from a B-side voice transmission signal, to a transmission path 2 as a corrected B-side voice transmission signal as well as to the adaptive filter 31 as a control signal. The control signal is expressed by $\mathbf{e}$ (hereinafter the vector is denoted by ve except for notations on the drawings) as an error signal corresponding to residual echo. The corrected B-side voice transmission signal from the DSP 3 is supplied to a speaker 6 forming part of a receiver on the speaker A side through the transmission path 2.

Figure 2:
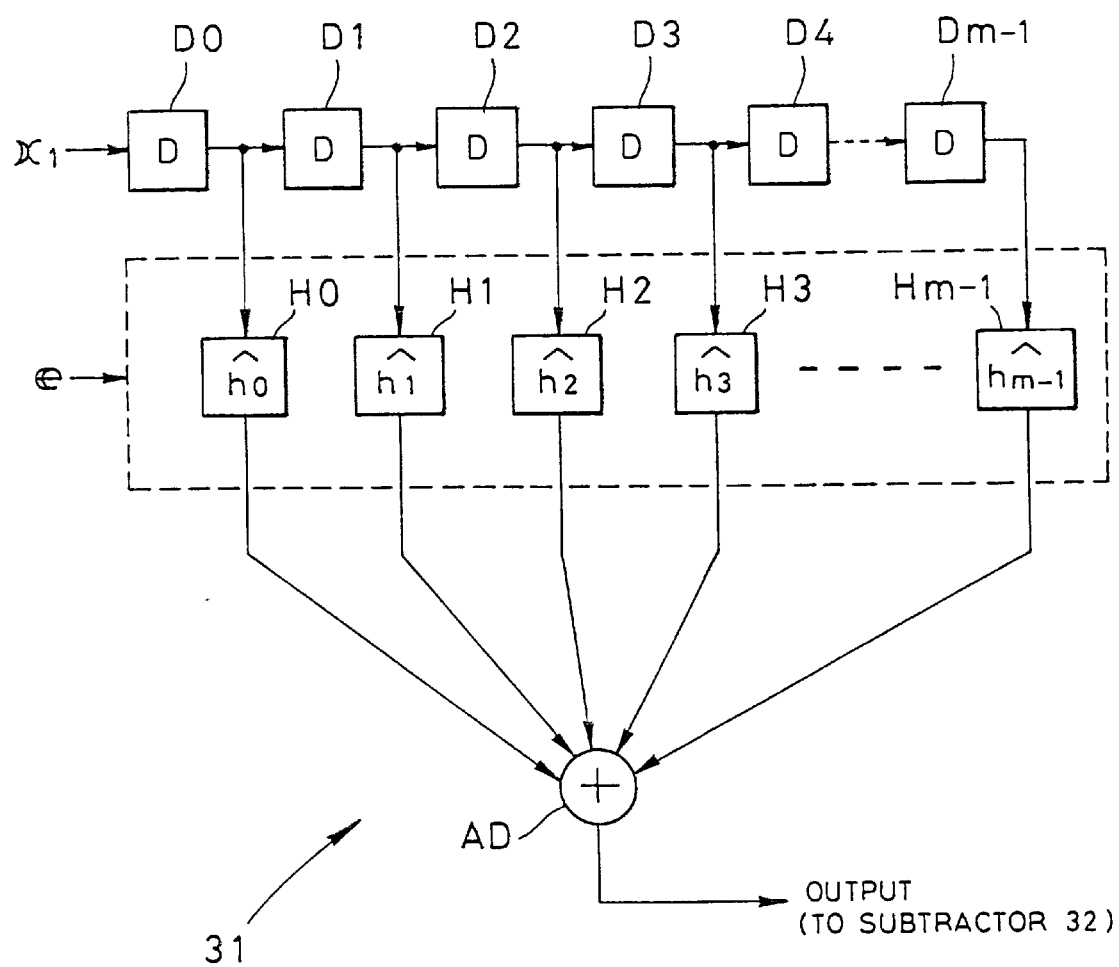
FIG. 2 is a conceptual block diagram illustrating the configuration of an adaptive filter used in the echo canceler of FIG. 1.

FIG. 2 illustrates in a conceptual block diagram the configuration of the adaptive filter 31 in greater detail.

Referring specifically to FIG. 2, the adaptive filter 31 is based on, for example, a known FIR filter and includes a group of one-sample delay lines D0, D1, . . . Dm1 connected in series and supplied with the B-side voice reception signal $^v x_1$; m coefficient multipliers H0, H1, . . . , Hm−1 each for multiplying an output of an associated delay line by a corresponding coefficient; and an adder AD for adding outputs of these multipliers to deliver the addition output as an output of the adaptive filter 31. Each of the multipliers is controlled by the error signal ve which is the output of the differential circuit 32. In this way, the transfer characteristic of the adaptive filter 31 can be learned and adapted based on the B-side voice reception signal $^v x_1$ and the error signal $^v e$.

Turning back to FIG. 1, a transfer characteristic of the acoustic radiation component from the loud speaker 4, captured by the microphone 5, between the microphone 5 and the loud speaker 4, i.e., a transfer function or a characteristic (hereinafter referred to as the "actual transfer function") of an acoustic error path $P_E$ is expressed by a vector $\mathbf{h}$ (hereinafter denoted by vh except for notations on the drawings). A transfer function or a characteristic (hereinafter referred to as the "pseudo-transfer function") of the adaptive filter 31, which is estimated to approximately obtain this actual transfer function, is expressed by a vector $\mathbf{\hat{h}}$ (hereinafter denoted by 'h' except for notations on the drawings).

Next, the principles of acoustic echo removal according to the present invention will be explained.

Referring again to FIG. 1, the principles of the present invention are intended to block the component of the signal $x_1$ from the speaker A side from passing through the acoustic echo path $P_E$ on the speaker B side or from being fed back thereto to return to the speaker A side, thus preventing acoustic echo.

$^v y$ including such a feedback component is expressed by:

$$^v y = {}^v x_1[*]^v h + {}^v x_2 \tag{1}$$

The error signal $^v e$ is expressed by:

$$\begin{aligned}^v e &= {}^v y - {}^v x_1[*]^v h' \\ &= ({}^v x_1[*]^v h + {}^v x_2) - {}^v x_1[*]^v h' \\ &= {}^v x_1[*]({}^v h - {}^v h') + {}^v x_2 \\ &= {}^v x_1[*]\Delta^v h + {}^v x_2 \end{aligned} \tag{2}$$

wherein, $\Delta^v h$ is substituted for $^v h - {}^v h'$, and $[*]$ represents a convolutional operator. Assume hereinafter that a variable a indicative of a vector amount is expressed by "$^v a$" in a similar manner.

A Fourier transform of Equation (2) results in:

$$^v E = {}^v X_1 \cdot {}^v \Delta H + {}^v X_2 \tag{3}$$

Equation (3) represents an error signal in a frequency region including a complex component.

Then, a complex conjugate $^v X_1^*$ ("*" represents a complex conjugate) of $^v X_1$ is multiplied on both sides of Equation (3) to derive:

$$^v X_1^* \cdot {}^v E = {}^v X_1^* \cdot {}^v X_1 \cdot {}^v \Delta H + {}^v X_1^* \cdot {}^v X_2 \tag{4}$$

$$\therefore {}^v X_1^* \cdot {}^v E = |{}^v X_1|^2 \cdot {}^v \Delta H + {}^v X_1^* \cdot {}^v X_2 \tag{5}$$

Further, a time average is calculated for both sides:

$$\overline{{}^v X_1^* \cdot {}^v E} = \overline{|{}^v X_1|^2 \cdot {}^v \Delta H} + \overline{{}^v X_1^* \cdot {}^v X_2} \tag{6}$$

In Equation (6), a time-averaged variable a is denoted by "$\overline{a}$", and the same is also applied to the following equations.

Considering the second term $\overline{X_1^* \cdot {}^v X_2}$ of the right side in Equation (6), $^v X_1^* \cdot {}^v X_2$ defines a cross-correlation function and forms a cross-spectrum for the feedback signal component $^vx_1$ passed through the acoustic echo path $P_E$ and the signal component $^vx_2$ including noise on the speaker B side. Thus, assuming that both the signal components has no correlation with each other, it can be said that $X_1^* \cdot {}^vX_2$ is equal to zero. Under this condition, the following equation is satisfied:

$$\overline{{}^vX_1^* \cdot {}^vE} = |{}^vX_1|^2 \cdot {}^v\Delta H \qquad (7)$$

Also, if $^v\Delta H$ varies slowly, i.e., if a varying speed of $^vh$ is sufficiently slow as compared with a signal processing speed of the DSP 3, the following equation can be derived:

$$\overline{{}^vX_1^* \cdot {}^vE} = \overline{|{}^vX_1|^2 \cdot {}^v\Delta H} \fallingdotseq \overline{|{}^vX_1|^2} \cdot {}^v\Delta H \qquad (8)$$

$$\fallingdotseq \overline{|{}^vX_1|^2} \cdot {}^v\Delta H$$

Thus, from Equation (8):

$$^v\Delta H = \overline{{}^vX_1^* \cdot {}^vE} / \overline{|{}^vX_1|^2} \qquad (9)$$

is derived. Also, since $$^v\Delta H = {}^vH - {}^vH' \qquad (10)$$

a transfer function $'h'$ of the adaptive filter 31 can be estimated based on:

$$'H'={}^vH-{}^v\Delta H \qquad (11)$$

It should be noted that inverse Fourier transform may be utilized to derive $'h'$ from $'H'$.

As described above, the principles of the present invention allow the transfer function $'h'$ of the adaptive filter 31 to be estimated without influences of the signal component $^vx_2$ inherent to the speaker B side, so that the adaptive filter 31 can generate correct pseudo-echo only in accordance with the feedback signal component $^vx_1$, thus leading to appropriate removal of acoustic echo.

Next, a procedure of specific processing executed by the DSP 3 based on the principles explained above will be described with reference to FIG. 3.

Referring specifically to FIG. 3, the DSP 3 first sets one to a variable i indicative of a frame number in one estimation as initial setting (step S11), and also sets variables $^vS_{XE}$, $S_X$ to zero, respectively (step S12).

Then, the DSP 3 reads one frame portion of error signal and discrete data trains $^ve_i$, $^vx_{1i}$ corresponding to a B speaker side voice reception signal (step S13). The frame is the unit of time, and its length is selected to be a value required to satisfy the aforementioned Equation (7), details of which will be described later. The time length of the frame corresponds to the number of samples in the discrete data trains $^ve_i$, $^vx_{1i}$ so that the read signal may be written as $^ve_i(k)$, $^vx_{1i}(k)$ {k=0, 1, 2, ..., n−1} if one frame corresponds to the number of n samples.

The DSP 3 further Fourier transforms the one frame portion of $^ve_i$, $^vx_{1i}$ thus read during an associated frame period, stores the results of the Fourier transform in variables $^vE_i$, $^vX_{1i}$ (step S14), and multiplies $^vE_i$ by a complex conjugate $^vX_{1i}^*$ of $^vX_{1i}$ to derive $^vE_i \cdot {}^vX_{1i}^*$ (step S15). The processing at steps S14, S15 corresponds to the calculation of Equation (3) and the calculation of the numerator in the right side of Equation (9) which is not averaged.

The DSP 3 further calculates $|{}^vX_{1i}|^2$ for deriving the power of $^vX_{1i}$ (step S16). This processing corresponds to the calculation of the denominator in the right side of Equation (9) which is not averaged.

Subsequent to steps S15 and S16, the DSP 3 executes the following calculation for deriving collected values on a time series axis (step S17):

$$^vS_{XE} = {}^vS_{XE} + {}^vX_{1i}^* \cdot {}^vE_i \qquad (12)$$

$$S_X = S_X + |{}^vX_{1i}|^2 \qquad (13)$$

When i=1, i.e., in the first frame, the values $^vX_{1i}^* \cdot {}^vE_i$ and $|{}^vX_{1i}|^2$ calculated at steps S15 and S16 are stored as they are in variables $^vS_{XE}$ and $S_X$, respectively.

After completing the calculation at step S17, the DSP 3 adds one to the current value of the variable i (step S18), and determines whether or not the updated value of i is larger than a predetermined value N (step S19). If not, the procedure proceeds to step S13. The predetermined value N represents the number of frames for indicating how many times the processing at steps S13–S17 should be repeated, and employed therefor is a value which reduces the second term $X_1^* \cdot {}^vX_2$ of the right side in Equation (6) to a sufficiently small value. How the predetermine value N is selected is described later in detail.

At step S13 after passing step S19, the DSP 3 reads discrete data trains $^ve_i$, $^vx_{1i}$ for a frame next to the preceding frame, and the processing at steps S14–S17 is performed on the read discrete data trains $^ve_i$, $^vx_{1i}$ in a similar manner. It should be noted that at step S17 of the current loop, values derived by adding the values of $^vX_{1i}^* \cdot {}^vE_i$ and $|{}^vX_{1i}|^2$ calculated for the current frame to the values of variables $^vS_{XE}$ and $S_X$ calculated in the preceding frames, respectively, are newly stored in the variables $^vS_{XE}$ and $S_X$. For example, when i=2, i.e., in the second frame, the values of $^vX_{12}^* \cdot {}^vE_2$ and $|{}^vX_{12}|^2$ calculated at steps S15 and S16 are added to the values of the variables $^vS_{XE}$ and $S_X$, respectively. Stated another way, at step S17, the values of $^vX_{1i}^* \cdot {}^vE_i$ and $|{}^vX_{1i}|^2$ calculated for each frame are sequentially added to the preceding values, and the results of the additions are stored in the variables $^vS_{XE}$ and $S_X$, respectively.

The foregoing processing corresponds to accumulation or integration of the values of $^vX_{1i}^* \cdot {}^vE_i$ and $|{}^vX_{1i}|^2$ in accordance with the frame series or the time series.

When the value of i is determined to be equal to or less than the predetermined value N, the DSP 3 executes the following calculation (step S20):

$$\Delta {}^vH = {}^vS_{XE}/S_X \qquad (14)$$

This calculation corresponds to the aforementioned Equation (9). The reason for this is explained below. Equation (9) represents a division of time-averaged $^vX_{1i}^* \cdot {}^vE_i$ and $|{}^vX_{1i}|^2$. On the other hand, averaging of accumulatively added $^vX_{1i}^* \cdot {}^vE_i$, i.e., $^vS_{XE}$ at step S17 results in $^vS_{XE}/N$, and likewise, averaging of accumulatively added $|{}^vX_{1i}|^2$, i.e., $S_X$ results in $S_X/N$. Thus, the ratio of the two can be expressed by the form of Equation (14). It can be therefore said that the processing at step S20 corresponds to simultaneous executions of division of $^vX_{1i}^* \cdot {}^vE_i$ and $|{}^vX_{1i}|^2$ and averaging of these two variables.

After completing the calculation at step S21, the DSP 3 inverse Fourier transforms $\Delta {}^vH$ to $\Delta {}^vh$ (step S21). Then, the DSP 3 calculates the following equation to update the coefficient of the filter 31 (step S22):

$${}^v h' = {}^v h' + \Delta^v h \quad (15)$$

'h' may be expressed by a one-dimensional vector matrix $\{h_0', h_1', h_2', \ldots, h_{m-2}', h_{m-1}'\text{ m is an integer}\}$, so that 'h' can set coefficients to be multiplied by each of multipliers at m taps illustrated in FIG. 2.

After 'h' is updated at step S22, the procedure again returns to step S11 to repeat the processing so far described. Stated another way, a pseudo-transfer function of the adaptive filter is estimated for new N frames in order to prepare for the next update of 'h'.

The processing of FIG. 3 may be represented on the time series axis as illustrated in FIG. 4.

FIG. 4 shows how the values of the respective variables are finally determined for a series of frames. Since the variable i indicates the number of frame used for one estimation, the variable i is sequentially incremented by one from 1 to N following the frame as the estimation is advanced. Thus, corresponding to the value of the variable i, the values of the variables ${}^v e_i, {}^v X_{1i}, {}^v E_i, {}^v X_{1i}, {}^v X_{1i}{}^* \cdot {}^v E_i$, and $|{}^v X_{1i}|^2$ are calculated for each frame.

While the values of the variables ${}^v S_{XE}$ and $S_X$ are updated for each frame, their final values are established when the last frame (the Nth frame: #N in FIG. 4) is processed in each estimation. Also, as can be seen from steps S20–S22, the values of the variables $\Delta^v H, \Delta^v h$, and 'h' are also established in the last frame.

It should be noted that there are two aspects to be taken into account in the processing described above. One is the length of one frame, and the other is the length of N frames, i.e., a period of one estimation which represents a time length of the error signal ${}^v e$ and the B-side voice reception signal ${}^v x_1$ to be processed.

The first aspect is now discussed in detail. At step S15, ${}^v E_i$ is multiplied by ${}^v X_{1i}{}^*$, wherein $({}^v E_i{}^* \cdot {}^v X_{1i}{}^*)$ includes a component of $X_1{}^* X_2$ as can be seen from the aforementioned Equation (5). $X_1{}^* X_2$ forms a cross-correlation function, and the value of $X_1{}^* X_2$ for N frames are included in ${}^v S_{XE}$ by the accumulative addition of ${}^v S_{XE}$ at step S17. When the period of one estimation has been determined, as the frame length is made shorter, the value of N must be increased, resulting in a larger number of times the accumulative addition of ${}^v S_{XE}$ is executed. With a short frame length, $X_1{}^*$ also has a strong correlation between frames, and the same is true of $X_2$. In such a case, the component of $X_1{}^* X_2$ included in ${}^v S_{XE}$ derived in the last frame of the estimation is increased, so that even if ${}^v S_{XE}$ is averaged at step S20, the aforementioned Equation (7), in which the component of $X_1{}^* X_2$ is regarded as zero, is not expected to be satisfied.

In view of the nature of $X_1{}^* X_2$ for the cross-correlation function as mentioned above, the frame length is set. When a voice signal is handled, a time length of, for example, 20 ms may be set to the frame.

Now, the second aspect is discussed in detail. Preferably, the period of estimation is set longer for satisfying Equation (7). Stated another way, averaging over a longer time is advantageous for assuming that $\overline{X_1{}^* X_2}$ is zero. However, since an updating speed of 'h' must be higher than a varying speed of $\Delta^v H$ in order to satisfy Equation (8), it is necessary to make the period of the estimation shorter than at least an expected period of variations in $\Delta^v H$, i.e., a period of variations in 'h'.

Thus, the period of the estimation, and hence the value of N is set in view of an expected speed of updating 'h'. When the frame length is 20 ms, the value N may be 100 or the like.

In the foregoing embodiment, basically, the following equation:

$${}^v e = {}^v x_1 [\,*\,] \Delta^v h + {}^v x_2 \quad (16)$$

is Fourier converted to establish a correlation with ${}^v x_1$ in frequency region, and a component associated with ${}^v x_2$ in the second term of the right side is regarded to be zero, so as to avoid estimating the coefficient of the adaptive filter with the component of ${}^v x_2$ other than an echo component ${}^v x_1$ intercepted by the microphone 5.

Nevertheless, it is possible to realize this avoidance not only in frequency region but also in time region in principle.

Specifically, establishing a cross-correlation function of both sides of Equation (16) with ${}^v x_1$ instead of Fourier transform, the following equation is derived:

$$Rx_1 e = Rx_1 x_1 [\,*\,] \Delta^v h + Rx_1 x_2 \quad (17)$$

Wherein it is assumed that "Rab" represents a cross-correlation function of a vector a and a vector b.

Then, when Equation (17) is averaged:

$$\overline{Rx_1 e} = \overline{Rx_1 x_1 [\,*\,] \Delta^v h} + \overline{Rx_1 x_2} \quad (18)$$

can be derived, wherein $\overline{Rx_1 x_2}$ can be regarded as zero similarly to the aforementioned Equation (7).

Furthermore, variations in $\Delta^v h$ may be limited to derive the following Equation (19) from Equation (18):

$$\overline{Rx_1 e} = \overline{Rx_1 x_1} [\,*\,] \Delta^v h \quad (19)$$

Finally, Equation (19) is inversely convoluted to derive $\Delta^v h$. Then, the transfer function 'h' of the adaptive filter can be calculated based on $\Delta^v h = {}^v h - {}^v h'$ without inverse Fourier transform.

In the embodiment so far described, the adaptive filter 31 has the transfer characteristic 'h' which is estimated such that the transfer characteristic 'h' becomes closer to the transfer characteristic 'h of the acoustic echo path $P_E$, and a pseudo-acoustic echo path is formed by applying the adaptive filter 31 with a voice reception signal ${}^v x_1$ input (transmitted) to the speaker 4. Then, a feedback signal, which has actually been transmitted through the acoustic echo path $P_E$, is set off by a signal transmitted through the pseudo-acoustic echo path, thus canceling acoustic echo fed back to the transmission side. This manner of cancellation is exactly the same as the prior art techniques. However, this embodiment has a remarkable effect in that the adaptive filter 31, while monitoring the error signal output from the differential circuit 32 for cancellation, updates the filter coefficient, after performing processing for removing ${}^v x_2$, which is an input component inherent to the speaker B side, from the error signal ${}^v e$, without sequentially changing the filter coefficient so as to minimize the error signal (residual echo) ${}^v e$. Stated another way, this embodiment is mainly characterized in that, in a method or an apparatus for erasing acoustic echo, which utilizes the adaptive filter 31 to generate a pseudo-echo component (output of the filter 31) from a voice reception signal ${}^v x_1$, for removing the pseudo-echo component from a voice transmission signal ${}^v y$, a feedback component only depending on the voice reception signal (for example, components except for ${}^v X_1{}^* \cdot {}^v X_2$ in Equation (5)) is extracted from the voice transmission signal ${}^v y$, and the voice reception signal ${}^v x_1$ is passed through the filter 31 to generate a pseudo-echo component while a transmission characteristic 'h' is set for the adaptive filter 31 in accordance with the feedback component. With this configuration, effects particular to the present invention can be produced.

More specifically, since the prior art adaptive filter sequentially changes a transfer function to simply minimize an error signal itself on real time domain and hence residual echo, the transfer function of the filter may be largely disturbed in response to the error signal which follows spasmodic changes in noise environment on a transmission path on the speaker B side due to double talk. On the other hand, since this embodiment always calculates the transfer function of the adaptive filter from an error signal in accordance with the feedback component, i.e., a true echo component which does not depend on such changes on the speaker B side, an appropriate transfer function can be stably established for the adaptive filter even if double talk occurs.

It is therefore possible to achieve the erasure of acoustic echo in a simple configuration capable of attending to double talk in a favorable manner, without requiring a semifixed filter or a convergence state determination means as provided in the system disclosed in the aforementioned article, because additional modifications are only needed for estimating the transfer function of the adaptive filter.

While the foregoing embodiment has been described in connection with the erasure of acoustic echo centered on the speaker A side, similar erasure can be achieved for acoustic echo on the speaker B side, i.e., voice transmitted by the speaker B which is fed back on the speaker A side to cause acoustic echo. In fact, a component equivalent to the DSP 3 illustrated in FIG. 1 may be provided also on the speaker A side. In addition, while the embodiment has been described in a one-to-one communication form, it goes without saying that the present invention can be applied to communications among a plurality of speakers.

Furthermore, while in the foregoing embodiment, removal of echo particular to the present invention is carried out by a DSP as a hardware configuration, the removal of echo may of course be implemented by any hardware configuration different from the DSP. In addition, while the foregoing embodiment has been described in a limiting sense, modifications may be made thereto as required within the scope of designs available to those skilled in the art.

According to the present invention as described above, favorable countermeasures to double talk can be taken in a simple configuration.

What is claimed is:

1. An acoustic echo erasing apparatus utilizing adaptive filter means to generate a pseudo-echo component from an audio reception signal and subtractor means to subtract said pseudo-echo component from an audio transmission signal to generate an error signal, comprising:

first means for establishing a cross-correlation function of said error signal and said audio reception signal;

second means for detecting an energy level of said audio reception signal;

third means for calculating the ratio of a time average of the value of said cross-correlation function to a time average of the value of said energy level; and fourth means for updating a transfer characteristic of said adaptive filter means based on said ratio, and passing said audio reception signal through said adaptive filter means to generate said pseudo-echo component.

2. An acoustic echo erasing apparatus according to claim 1, wherein said third means includes means for calculating averages of the values of said cross-correlation function and said energy level derived by said first and second means, respectively, during a predetermined time period, dividing the average of the value of said cross-correlation function by the average of the value of said energy level, and outputting the result of the division as the value of said ratio.

3. An acoustic echo erasing apparatus according to claim 1, wherein said first means includes means for Fourier transforming said error signal and said audio reception signal to respective transformed values, and means for multiplying the Fourier transformed value of said error signal by a complex conjugate of the Fourier transformed value of said audio reception signal to define the result of the multiplication as the value of said cross-correlation function.

4. An acoustic echo erasing apparatus according to claim 3, wherein said fourth means includes a process of inverse Fourier transforming the value of said ratio.

5. An acoustic echo erasing apparatus according to claim 1, further comprising an initialization means for reading said error signal and said audio reception signal as a sample value series for each frame having a predetermined time length;

wherein said first means discrete Fourier transforms the sample value series of said error signal and the sample value series of said audio reception signal for each said frame, multiplies the discrete Fourier transformed value of said error signal by a complex conjugate of the discrete Fourier transformed value of said audio reception signal, and defines the result of the multiplication as the value of said cross-correlation function;

said second means calculates an amplitude level of the discrete Fourier transformed value of said audio reception signal for each said frame;

said third means accumulatively adds respective values of said cross-correlation function and said amplitude level derived by said first means and said second means, respectively, for a predetermined number of frames continuous on a time series axis, divides the result of the accumulative addition of said cross-correlation function by the result of the accumulative addition of said amplitude level, and defines the result of the division as the value of said ratio; and said fourth means inverse-discrete-Fourier transforms the value of said ratio to define the inverse-discrete-Fourier transformed value as an error of the transfer characteristic of said adaptive filter means, and updates the transfer characteristic of said adaptive filter so as to reduce said error to substantially zero.

6. An acoustic echo erasing apparatus which generates a pseudo-echo component from a audio reception signal, and subtracts said pseudo-echo component from an audio transmission signal to generate an error signal, comprising:

signal processing means for executing a first step of establishing a cross-correlation function of said error signal and said audio reception signal, a second step of detecting an energy level of said audio reception signal, a third step of calculating the ratio of a time average of the value of said cross-correlation function to a time average of the value of said energy level, and a fourth step of updating a transfer characteristic of said adaptive filter means based on said ratio, and passing said audio reception signal through said adaptive filter means to generate said pseudo-echo component.

7. An acoustic echo erasing apparatus according to claim 2, wherein said first means includes means for Fourier transforming said error signal and said audio reception signal to respective transformed values, and means for multiplying the Fourier transformed value of said error signal by a complex conjugate of the Fourier transformed value of said audio reception signal to define the result of the multiplication as the value of said cross-correlation function.

* * * * *